United States Patent
Chen et al.

(10) Patent No.: US 8,850,379 B2
(45) Date of Patent: Sep. 30, 2014

(54) METHOD OF AND SYSTEM FOR GENERATING OPTIMIZED SEMICONDUCTOR COMPONENT LAYOUT

(75) Inventors: Chien-Hung Chen, Taipei (TW); Yung-Chow Peng, Hsinchu (TW); Chung-Hui Chen, Hsinchu (TW); Chih Ming Yang, Hsinchu (TW)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 141 days.

(21) Appl. No.: 13/352,738

(22) Filed: Jan. 18, 2012

(65) Prior Publication Data

US 2013/0185689 A1    Jul. 18, 2013

(51) Int. Cl.
*G06F 9/455* (2006.01)
*G06F 17/50* (2006.01)

(52) U.S. Cl.
USPC ........... 716/132; 716/110; 716/111; 716/119; 716/122

(58) Field of Classification Search
USPC .......................................... 716/132
See application file for complete search history.

(56) References Cited

U.S. PATENT DOCUMENTS

| | | | |
|---|---|---|---|
| 2008/0127025 A1* | 5/2008 | Zorrilla et al. | 716/12 |
| 2009/0267124 A1* | 10/2009 | Bosshard | 257/296 |

\* cited by examiner

*Primary Examiner* — Vuthe Siek
*Assistant Examiner* — Eric Lee
(74) *Attorney, Agent, or Firm* — Lowe Hauptman & Ham, LLP (57) ABSTRACT

A method of generating an optimized layout of semiconductor components in conformance with a set of design rules includes generating, for a unit cell including one or more semiconductor components, a plurality of configurations each of which satisfies some, but not all, of the design rules. For each configuration, it is checked whether a layout, which is a repeating pattern of the unit cell, satisfies the remaining design rules. Among the configurations which satisfy all of the design rules, the configuration providing an optimal value of a property is selected for generating the optimized layout of the semiconductor components.

20 Claims, 8 Drawing Sheets

METHOD OF AND SYSTEM FOR GENERATING OPTIMIZED SEMICONDUCTOR COMPONENT LAYOUT

TECHNICAL FIELD

The present disclosure relates to a method of and a system for generating an optimized semiconductor component layout.

BACKGROUND

The recent trend in miniaturizing integrated circuits (ICs) has resulted in smaller devices which consume less power, yet provide more functionally at higher speeds than before. The miniaturization process has also resulted in stricter manufacturing specification. Both satisfying the manufacturing specification and achieving an optimized design for a semiconductor device may not be problematic at low process nodes. However, achieving a design optimization while continuing to satisfy the manufacturing specification becomes more challenging at advanced process nodes.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

DETAILED DESCRIPTION

It is to be understood that the following disclosure provides many different embodiments or examples, for implementing different features of various embodiments. Specific examples of components and arrangements are described below to simplify the present disclosure. An inventive concept may, however, be embodied in many different forms and should not be construed as being limited to the embodiments set forth herein; rather, these embodiments are provided so that this description will be thorough and complete, and will fully convey an inventive concept to those of ordinary skill in the art. It will be apparent, however, that one or more embodiments may be practiced without these specific details.

In the drawings, the thickness and width of layers and regions are exaggerated for clarity. Like reference numerals in the drawings denote like elements. The elements and regions illustrated in the figures are schematic in nature, and thus relative sizes or intervals illustrated in the figures are not intended to limit the scope of an inventive concept.

One or more method and/or system for generating an optimized layout of semiconductor components in conformance with a set of design rules will be now described.

As used herein, "design rules" are constraints set forth for or by a manufacturing process to ensure that semiconductor devices to be made by the manufacturing process can be manufactured and that the manufactured devices operate as intended. For example, some design rules define constraints on dimensions, such as width and length, of each semiconductor component. Such design rules are sometimes governed by the limits of technology used in the manufacturing process. Some design rules define constraints on spacings in one or more directions between adjacent semiconductor components, e.g., to avoid unintended short circuits.

Some design rules define constraints on alignments between two or more layers, e.g., to ensure sufficient overlaps for subsequent formation of electrical connections between the layers. Some design rules include constraints on material density, electrostatic discharge, input/output, etc. The above list of exemplary design rules is not exhaustive, and other design rules are usable in one or more embodiments.

As used herein, a "semiconductor component" is a passive or active component formed as part of an IC. Examples of passive components include, but are not limited to, resistors, capacitors and inductors. Examples of active components include, but are not limited to, diodes, field effect transistors (FETs), metal-oxide-semiconductor FETs (MOSFETs), complementary metal-oxide-semiconductor (CMOS) transistors, and bipolar transistors.

As used herein, a "layout of semiconductor components" is a physical arrangement of the semiconductor components in a die or IC of which the semiconductor components are formed as part. A layout is not necessarily limited to a single layer. In some embodiments, a layout includes several layers of one or more of conductive, dielectric, and semiconductor materials. The semiconductor components in a layout are not necessarily of the same type. In some embodiments, a layout includes several types of semiconductor components, e.g., transistors and capacitors.

In the following description, semiconductor components are MOSCAPs, and optimization of a layout of MOSCAPs is discussed in detail. However, as noted above, layouts of other types of semiconductor components are optimizable in accordance with the methodology disclosed herein.

Figure 1A:
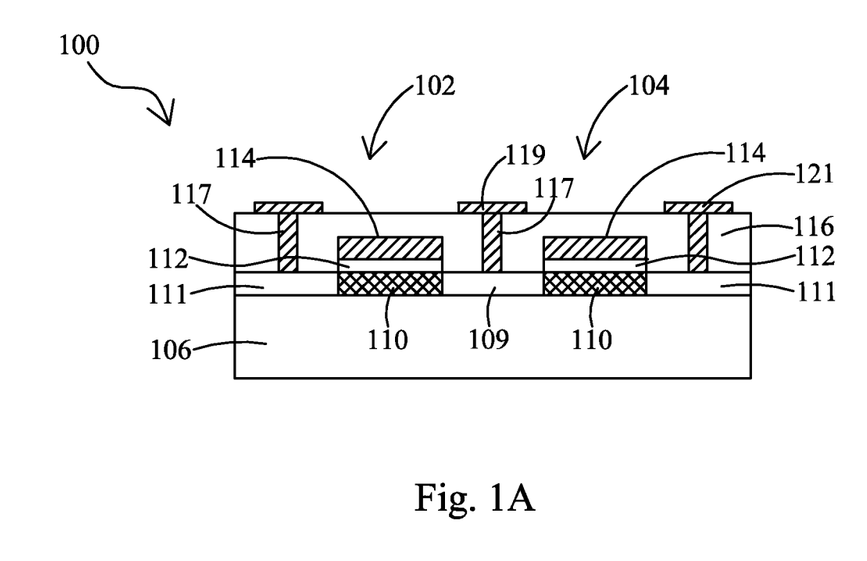
FIG. 1A is a schematic cross-section view of a portion of an IC including metal-oxide-semiconductor capacitors (MOSCAPs) in accordance with some embodiments.
Figure 1B:
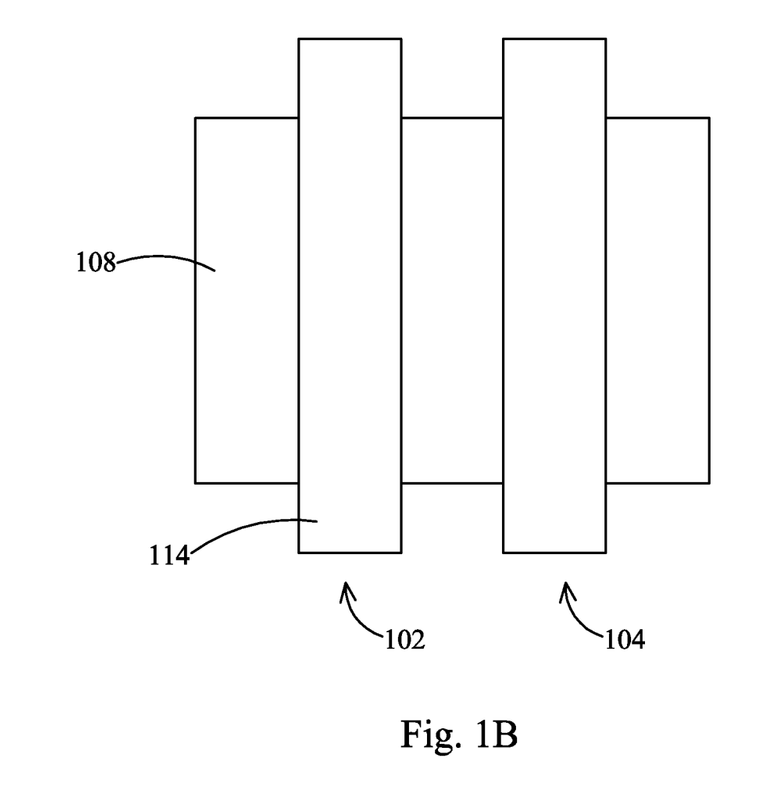
FIG. 1B is a schematic top view of the portion of the IC in FIG. 1A.

FIG. 1A is a schematic cross-section view of a portion of an IC 100 including two MOSCAPs 102, 104 in accordance with some embodiments. FIG. 1B is a schematic top view of the portion of the IC 100 in FIG. 1a.

The MOSCAPs 102, 104 are formed over a substrate 106. In some embodiments, the substrate 106 is a semiconductor substrate, and includes, but is not limited to, bulk silicon, a semiconductor wafer, a silicon-on-insulator (SOI) substrate, or a silicon germanium substrate. Other semiconductor materials including group III, group IV, and group V elements are used in some embodiments. The substrate 106 includes dopants, e.g., p-dopants, in some embodiments. In some embodiments, the substrate 106 includes a well region, e.g., an n-well region, over which the MOSCAPs 102, 104 are formed.

An active layer 108 is formed over the substrate 106. The active layer 108 includes multiple source regions 109, channel formation regions 110, and drain regions 111 arranged alternatingly, with each channel formation region 110 positioned between one source region 109 and one drain region 111. In some embodiments, the source regions 109 and drain regions 111 include dopants of the same type. For example, the source regions 109 and drain regions 111 are p-doped regions. In further embodiments, the source regions 109 and drain regions 111 include dopants of different types. For example, the source regions 109 are p-doped regions, and the drain regions 111 are n-doped regions. Alternatively, the source regions 109 are n-doped regions, and the drain regions 111 are p-doped regions. The source regions 109, channel formation regions 110 and drain regions 111 are together referred to herein as "oxide definition regions" or "OD region."

A gate dielectric layer 112 is formed over each of the channel formation regions 110. In some embodiments, the gate dielectric layer 112 includes high-k or ultra-high-k materials. The gate dielectric layer 112 defines the capacitor dielectric material for the MOSCAPs 102, 104.

A gate electrode 114 of a conductive material is formed over the gate dielectric layer 112. In some embodiments, the gate electrode 114 is polysilicon and formed, e.g., by a gate-first process. In some embodiments, the gate electrode 114 is a metal and formed, e.g., by a gate-last or gate-replacement process. The description below is given specifically for a polysilicon gate (also referred to herein as "poly region") and is also applicable to metal gates or gates made of other conductive materials.

An intermediate dielectric layer 116 is deposited over the substrate 106, including the gate electrode 114. In some embodiments, spacers are also formed on opposite sides of the gate electrode 114. Conductive vias 117 are formed through the intermediate dielectric layer 116. A source electrode 119 is formed over one of the conductive vias 117 to be electrically connected to the corresponding source region 109. A drain electrode 121 is formed over one of the conductive vias 117 to be electrically connected to the corresponding drain region 111.

Each of MOSCAPs 102, 104 includes a channel formation region 110, a source region 109, a drain region 111, a gate dielectric layer 112, a gate electrode 114, and source and drain electrodes 119, 121. Two adjacent MOSCAPs share a source region 109 or a drain region 111. For example, the adjacent MOSCAPs 102, 104 in the specific portion of the IC 100 illustrated in FIG. 1A share the same source region 109. A further MOSCAP on the right hand side of the MOSCAP 104 shares the same drain region 111 with the MOSCAP 104.

In each MOSCAP, a first one of the capacitor electrodes is defined by the gate electrode 114, and the capacitor dielectric material is defined by the gate dielectric layer 112. The second capacitor electrode is defined by one or both of the source and drain electrodes 119, 121, or by the substrate 106. In some embodiments, the source and drain electrodes 119, 121 of each MOSCAP are commonly connected to define the second capacitor electrode of the MOSCAP. In some embodiments, the source electrode 119 is configured as the second capacitor electrode while the drain electrode 121 is left floating. In some embodiments, the substrate 106 is configured to function as the second capacitor electrode.

In some embodiments, multiple MOSCAPs are arranged in a MOSCAP area of an IC. For an advanced IC, such MOSCAP area occupies as much as 20-30% of the die area. In some embodiments, the layout of MOSCAPs in such a MOSCAP area is optimized with an aim to achieve a maximal value of capacitance efficiency, i.e., a maximal value of capacitance per unit area (e.g., measured in $fF/\mu m^2$). With such an MOSCAP area optimization, the MOSCAP area is reduced while ensuring a predetermined value of total capacitance, and/or an increased value of total capacitance is achieved at a given MOSCAP area. The MOSCAP area optimization is performed in conformance with a set of design rules associated with a manufacturing process of the MOSCAPs.

Figure 2:
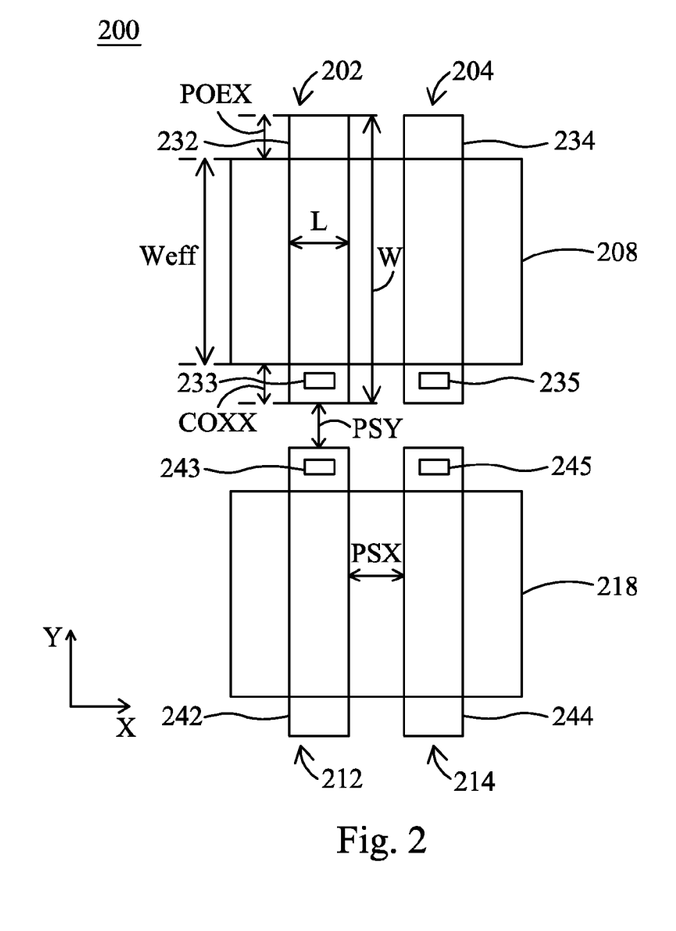
FIG. 2 is a schematic top view of a unit cell of a MOSCAP layout in accordance with some embodiments.
Figure 3:
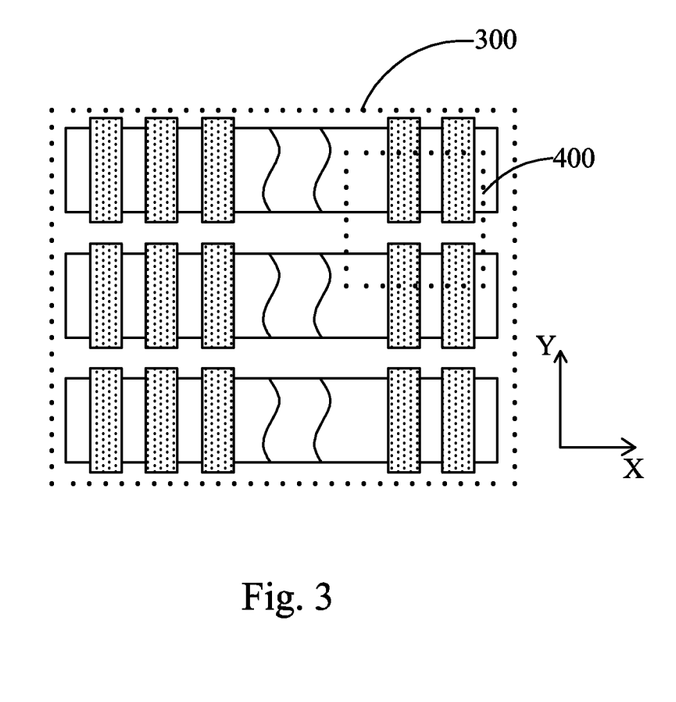
FIG. 3 is a schematic top view of a MOSCAP layout in accordance with some embodiments.
Figure 4:
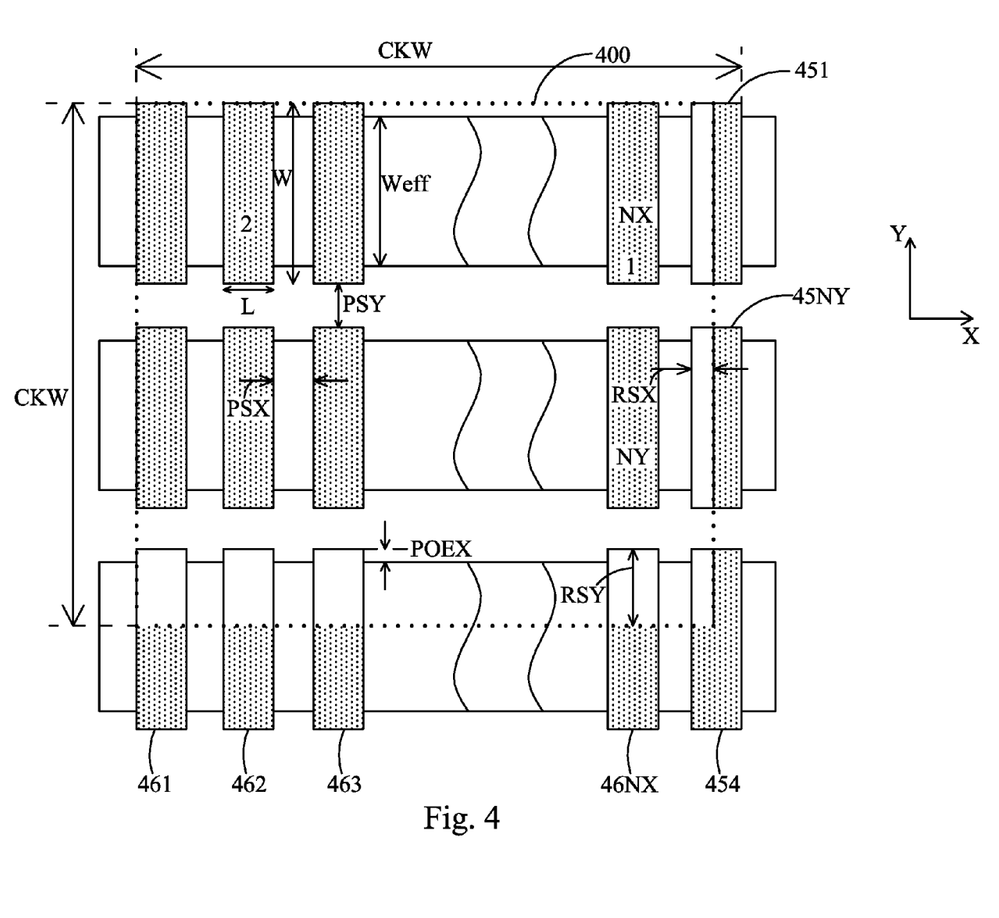
FIG. 4 is a schematic top view of a part of a MOSCAP layout within a check window in accordance with some embodiments.

Several design rules governing a MOSCAP layout in accordance with some embodiments is now described with respect to FIGS. 2-4. FIG. 2 is a schematic top view of a unit cell 200 in accordance with some embodiments. FIG. 3 is schematic top view of a MOSCAP layout 300 in accordance with some embodiments. The MOSCAP layout 300 is a repeating pattern of the unit cell 200. FIG. 4 is a schematic top view of a part of the MOSCAP layout 300 within a check window 400 in accordance with some embodiments.

In FIG. 2, the unit cell 200 includes four MOSCAPs 202, 204, 212, 214, which are similar to the MOSCAPs 102, 104. The MOSCAPs 202, 204, 212, 214 include poly regions 232, 234, 242, 244 which are configured as gate electrodes similar to the gate electrode 114. The MOSCAPs 202, 204, 212, 214 further include OD regions 208, 218 which define various source regions, channel formation regions and drain regions similar to the source region 109, channel formation region 110 and drain region 111. The MOSCAPs 202, 204, 212, 214 are arranged side by side in two directions X and Y. The X direction is referred to as a device length direction along which the OD regions 208, 218 extend. The Y direction is referred to as a device width direction along which the poly regions 232, 234, 242, 244 extend.

Each of the poly regions 232, 234, 242, 244 includes a connecting portion 233, 235, 243, 245 for electrical connection to other layers and/or components of the IC. Each of the connecting portions 233, 235, 243, 245 is arranged at an end of the corresponding poly region 232, 234, 242, or 244 that projects in the Y direction beyond the corresponding OD region 208 or 218. The connecting portions 233, 235, 243, 245 of the poly regions 232, 234, 242, 244 adjacent in the Y direction are arranged at the facing ends of the adjacent poly regions 232, 234, 242, 244, i.e., at the lower ends of the poly regions 232, 234 and the upper ends of the poly regions 242, 244 in FIG. 2. In some embodiments, connecting portions are arranged at both ends of one or more poly regions 232, 234, 242, 244.

The design rules governing the MOSCAP layout 300 include one or more rules that define limits on dimensions of each MOSCAP, e.g., limits on dimensions of the corresponding poly region and OD region of the MOSCAP. For example, a poly area rule defines at least one of a maximum value, a minimum value, or a range, of an area of each poly region. A poly length rule defines at least one of a maximum value, a minimum value, or a range, of a length L of each poly region in the X direction (i.e., the device length direction). The poly area rule and poly length rule together define at least one limit on a width W of each poly region in the Y direction (i.e., the device width direction). An effective device width rule defines at least one of a maximum value, a minimum value, or a range, of a width of each OD region in the Y direction (i.e., the device width direction).

Poly extension rules define limits (e.g., at least one of a maximum value, a minimum value, or a range) on dimensions POEX and COXX of the ends of each poly region that project in the Y direction beyond the corresponding OD region. In some embodiments, the limit on the dimension POEX of the end without a connecting portion (e.g., the upper end of the poly region 232 in FIG. 2) is different from the limit on the dimension COXX of the end that has a connecting portion (e.g., the lower end of the poly region 232 in FIG. 2). For example, COXX is set greater than POEX to ensure that the end with a connecting portion (e.g., the lower end of the poly region 232 in FIG. 2) is sufficiently sized for ensuring proper electrical connection to other layers or components of the IC.

In some embodiments, the design rules governing the MOSCAP layout 300 further include one or more rules that define limits on spacings between adjacent MOSCAPs. For example, a poly X spacing rule defines at least one of a maximum value, a minimum value, or a range, of a spacing PSX in the X direction between adjacent poly regions. A poly Y spacing rule defines at least one of a maximum value, a minimum value, or a range, of a spacing PSY in the Y direction between adjacent poly regions.

In some embodiments, the design rules governing the MOSCAP layout 300 also include one or more rules that define further constraints on the MOSCAP layout 300. For example, a relative poly density rule defines at least one of a maximum value, a minimum value, or a range, of a relative poly density within a check window 400 (FIG. 3). Similarly, e.g., a relative OD density rule defines at least one of a maximum value, a minimum value, or a range, of a relative OD density within the check window 400. A check window rule defines a size of the check window 400. In some embodiments, the check window 400 is placed at one or more predetermined locations within the MOSCAP layout 300 for checking the relative poly density and/or relative OD density. In some embodiments, the check window 400 is placed randomly at one or more locations within the MOSCAP layout 300 for checking the relative poly density and/or relative OD density. In some embodiments, the check window 400 is a square. In some embodiments, the check window 400 is a rectangle. Other shapes are usable in further embodiments.

The calculation of the relative poly density and relative OD density in accordance with some embodiments is now described with reference to FIG. 4 which is a schematic top view of a part of the MOSCAP layout 300 within the check window 400. The check window 400 includes NX full poly regions in the X direction and NY full poly regions in the Y direction, where NX and NY are positive integers. The total number of full poly regions in the check window 400 is NX×NY. NX full poly regions within the check window 400 are representatively indicated by numbers 1, 2, ... NX in the X direction. NY full poly regions within the check window 400 are representatively indicated by numbers 1, ... NY in the Y direction.

The check window 400 further includes (NY+1) partial poly regions in the X direction. Specifically, poly regions 451, ... 45NY and 4546 each include a portion having a dimension RSX in the X direction and located within the check window 400. Similarly, the check window 400 further includes (NX+1) partial poly regions in the Y direction. Specifically, poly regions 461, 462, 463, ... 46NX and 4546 each include a portion having a dimension RSY in the Y direction and located within the check window 400. The check window 400 is a square and has a size of CKW×CKW.

The relative poly density within the check window 400 is a ratio of the total area of the poly regions within the check window 400 to the total area of the check window 400. The relative poly density is calculated as PDX×PDY, where $$PDX=(NX \times L+RSX)/CKW;$$

$$PDY=(NY \times W+RSY)/CKW;$$

$0 \leq RSX \leq L;$
$0 \leq RSY \leq W;$

PDX is the relative poly density in the X direction; and
PDY is the relative poly density in the Y direction.

The relative OD density within the check window 400 is a ratio of the total area of the OD regions within the check window 400 to the total area of the check window 400. The relative OD density is calculated as ODX×ODY, where $$ODX=100\%;$$

$$ODY=(NY \times Weff+RSY)/CKW;$$

ODX is the relative OD density in the X direction; and
ODY is the relative OD density in the Y direction.

The calculated relative poly density and relative OD density are compared against the limits (e.g., maximum relative poly density and maximum relative OD density) defined by the relative poly and OD density rules to determine whether the rules are satisfied.

The above described design rules are summarized in the list below. The list is not exhaustive and further design rules are usable in further embodiments.

Figure 5:
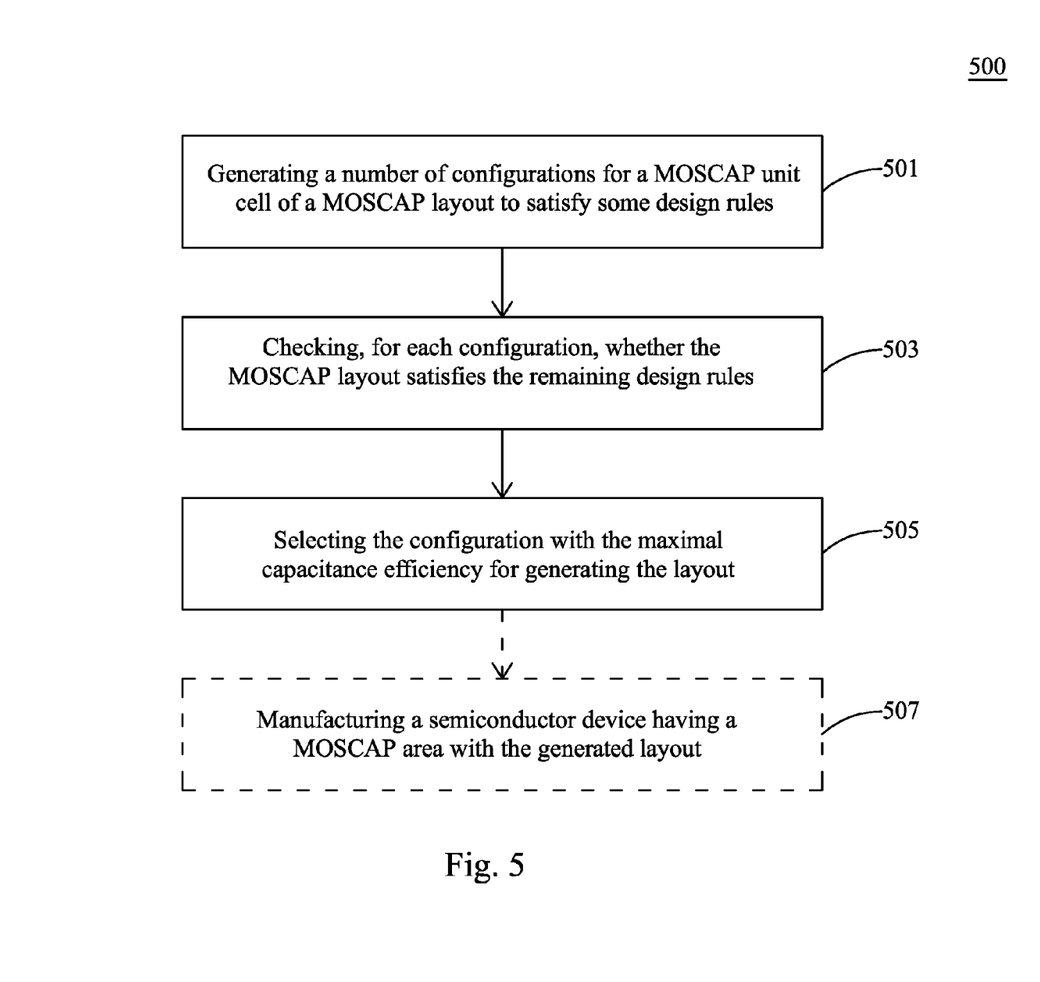
FIGS. 5-6 are flow charts of various methods in accordance with some embodiments.

Poly area
Poly length (L)
Effective device width (Weff)
Poly extension (POEX, COXX)
Poly X spacing (PSX)
Poly Y spacing (PSY)
Check window size (CKW)
Relative poly density
Relative OD density FIG. 5 is a flow chart of a method 500 in accordance with some embodiments. The method 500 is performed to optimize a MOSCAP layout while ensuring conformance of the MOSCAP layout with a set of design rules.

At step 501, a number of configurations for a MOSCAP unit cell of a MOSCAP layout is generated to satisfy some design rules. In some embodiments, the MOSCAP unit cell is similar to the unit cell 200, and various configurations for the MOSCAP unit cell are generated to satisfy the Poly area, Poly length (L), Effective device width (Weff), Poly extension (POEX, COXX), Poly X spacing (PSX), and Poly Y spacing (PSY) rules.

For example, the Poly area rule states that the area of each poly region is in a range from 1.5 to 3.0 $\mu m^2$. At a step (increment) of 0.5 $\mu m^2$, there are 4 possible configurations for the area of each poly region, namely, 1.5, 2.0, 2.5, and 3.0 $\mu m^2$.

Further, the Poly length rule states that the length L of each poly region is in a range from 0.22 to 2 $\mu m$. At a step (increment) of 0.02 $\mu m$, there are 90 possible configurations for the length of each poly region.

Based on the Poly area rule and Poly length rule, 360 (i.e., 4×90) possible configurations for the poly size are generated. For each generated configuration, a poly width W is calculated as W=Poly area/L. An effective device width (Weff) for each generated configuration is further calculated as Weff=W−(COXX+POEX). In some embodiments, configurations with the calculated Weff values that do not satisfy the Effective device width (Weff) are eliminated from further consideration at this stage. In further embodiments, a check against the Effective device width rule is performed at a later stage.

The Poly X spacing (PSX) is fixed in this example. The Poly Y spacing (PSY) rule states that the spacing between adjacent poly regions in the Y direction is in a range from 0.18 to 0.98 $\mu m$. At a step (increment) of 0.01 $\mu m$, there are 80 possible configurations for the Y spacing between adjacent poly regions.

In this specific example, a total of 28800 (i.e., 360×80) possible configurations for the MOSCAP unit cell is generated which reflect 360 different poly sizes and 80 different Y spacings between adjacent poly regions. Fewer possible configurations are generated in embodiments where a check against the Effective device width rule is performed at an earlier stage.

At step 503, a check is made for each of the generated configurations to determine whether the MOSCAP layout satisfies the remaining design rules. In some embodiments, the remaining design rules include the Check window size (CKW), Relative poly density, and Relative OD density rules.

A MOSCAP layout, similar to the MOSCAP layout 300, is generated by duplicating the MOSCAP unit cell. In some embodiments, the MOSCAP unit cell is duplicated in both X and Y directions until a given portion of the die intended for the MOSCAP area is filled with MOSCAPs.

A check window similar to the check window 400 and having a size (e.g., 10×10 µm, 150×150 µm or 1000×1000 µm) defined by the Check window size (CKW) rule is placed at one or more predetermined or random locations in the MOSCAP layout, as described with respect to FIG. 3. The relative poly density and relative OD density are calculated within the check window for each of the generated configurations, as described with respect to FIG. 4. The calculated values of relative poly density and relative OD density are checked against the corresponding Relative poly density and Relative OD density rules, and configurations that do not satisfy the rules are eliminated. Configurations that satisfy all design rules are used for subsequent capacitor efficiency optimization.

At step 505, among the configurations satisfying all design rules, the configuration with the maximal capacitance efficiency is selected for generating the MOSCAP layout. In some embodiments, the capacitance of one or more MOSCAPs in each MOSCAP unit cell is simulated based on one or more parameters such as poly sizes, poly spacing, dielectric material, operating voltage, etc. The simulated capacitance of the one or more MOSCAPs is then used to calculate the capacitance efficiency of the MOSCAP layout.

At step 507, a semiconductor device having a MOSCAP area with the generated layout is manufactured. The obtained MOSCAP area satisfies all design rules set forth for the relevant manufacturing process, yet ensuring an optimal value of capacitance efficiency. In some embodiments, step 507 is omitted.

In some embodiments, it is possible to quickly compare several process nodes to determine the optimal process node to be used for manufacturing MOSCAPs in a given area and/or to have a given capacitance. Specifically, a set of design rules associated with each process nodes are received, e.g., from the manufacturer, and an optimal MOSCAP layout is determined in accordance with the methods described herein. By simply replacing one set of design rules of one process node with another set of design rules of another process node, various optimal MOSCAP layouts are obtained and the process node with the most optimal MOSCAP layout is determinable. The described method, in some embodiments, does not require any layout resource or multiple iterations.

In some embodiments, one or more of the design rules is/are less important than the other rules, and it is possible to relax the less important rules in order to obtain an optimal layout. For example, in some embodiments, the relative OD density rule is not as important as the relative poly density rule, and it is possible to relax or stretch the relative OD density under certain circumstances.

In some embodiments, each unit cell is not necessary to include four MOSCAPs as described with respect to FIG. 2. In some embodiments, each unit cell has a single MOSCAP and is sized to reflect the required poly X and Y spacings, e.g., with a half of the required poly X or Y spacing on each side of the poly region. In some embodiments, each unit cell has a two MOSCAPs adjacent in the X or Y direction. In some embodiments, more than four MOSCAPs are include in each unit cell.

Figure 6:
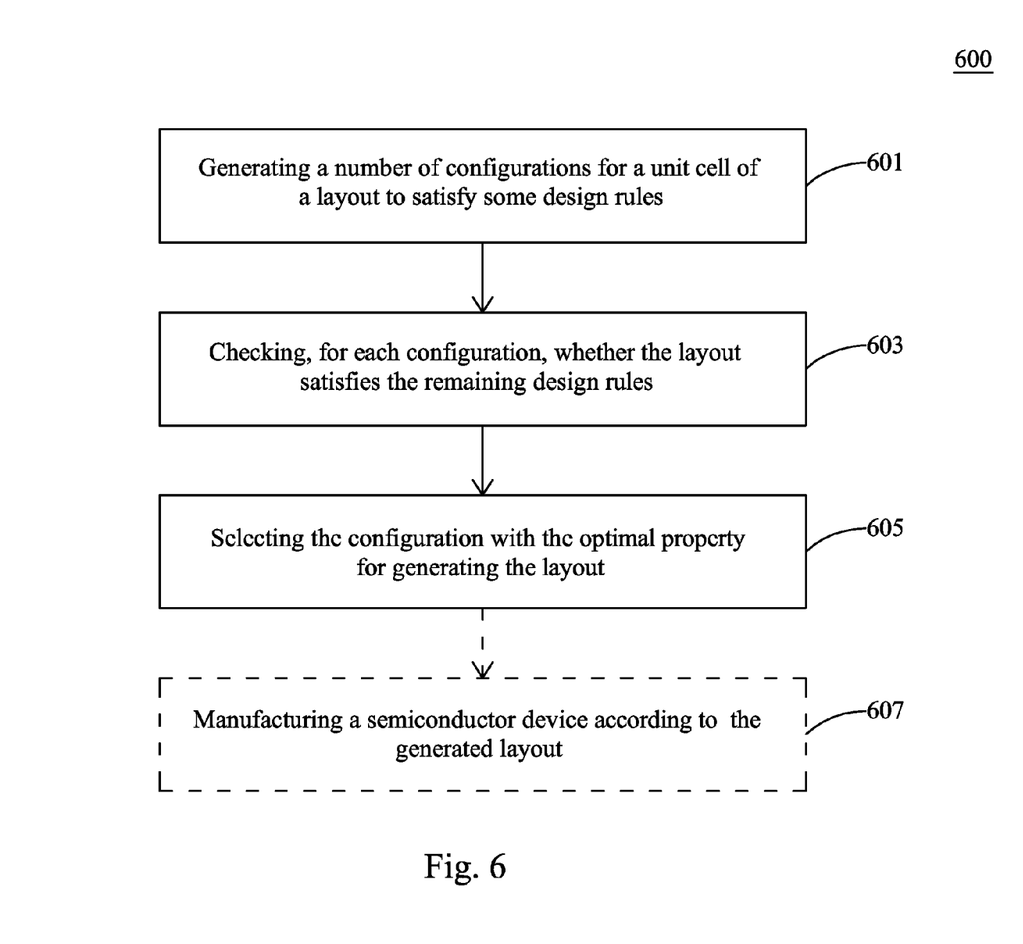

The above description with respect to MOSCAPs is also applicable to other semiconductor components. FIG. 6 is a flow chart of a method 600 in accordance with some embodiments. The method 600 is performed to optimize a layout of semiconductor components while ensuring conformance of the layout with a set of design rules.

At step 601, a number of configurations for a unit cell having at least one semiconductor component is generated to satisfy some design rules. For example, the configurations are generated to satisfy the design rules that define limits on a size or dimension of the semiconductor component and/or spacings between adjacent semiconductor components. In some embodiments, the methodology analogous to that described with respect to step 501 is also applicable to step 601.

At step 603, a check is made for each of the generated configurations to determine whether a layout, which is a repeating pattern of the unit cell, satisfies the remaining design rules. For example, the remaining design rules define limits on densities of different layers of the semiconductor component within a check window. In some embodiments, the methodology analogous to that described with respect to step 503 is also applicable to step 603.

At step 605, among the configurations satisfying all design rules checked at steps 601 and 603, the configuration with an optimal value of a property is selected for generating the layout of the semiconductor components. In some embodiments, the optimal value is a maximum value, a minimum value or a value that best matches a predetermined value or range. In some embodiments, the property being optimized is not directly defined in the set of design rules. For example, where the set of design rules set forth various physical dimensions for the semiconductor component and/or for the layout, the property being optimized is an electrical property of the semiconductor components in the layout. In some embodiments, a methodology analogous to that described with respect to step 505 is also applicable to step 605.

At step 607, a semiconductor device is manufactured with semiconductor components arranged in accordance with the generated layout. The obtained device satisfies all design rules set forth for the relevant manufacturing process, yet ensuring an optimal property of the semiconductor components. In some embodiments, step 607 is omitted.

Figure 7:
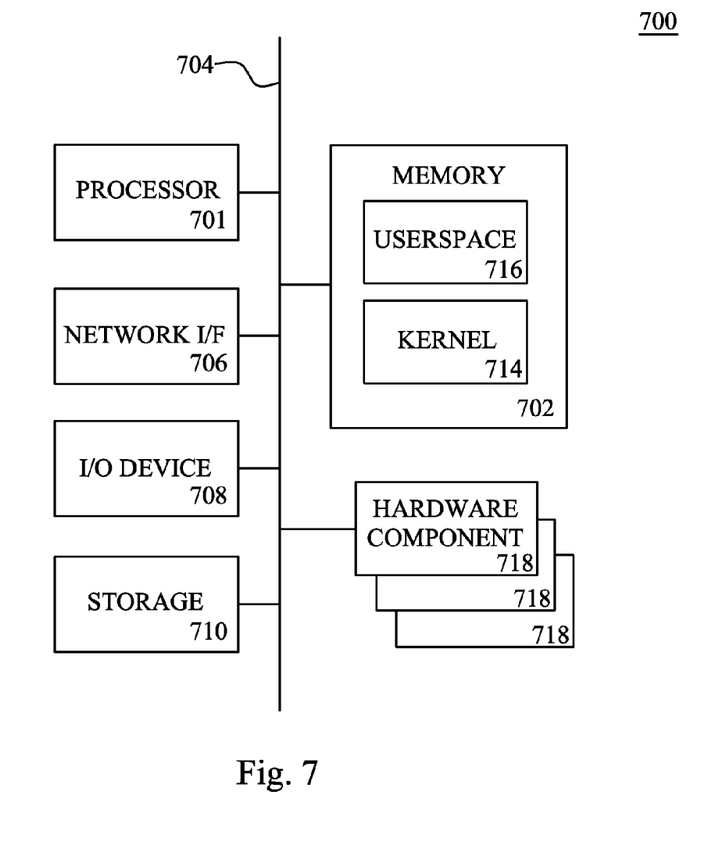
FIG. 7 is a block diagram of a computer system in accordance with some embodiments.

FIG. 7 is a block diagram of a computer system 700 in accordance with some embodiments. The system 700 comprises a processor 701, a memory 702, a network interface (I/F) 706, a storage 710, an input/output (I/O) device 708, and one or more hardware components 718 communicatively coupled via a bus 704 or other interconnection communication mechanism.

The memory 702 comprises, in some embodiments, a random access memory (RAM) and/or other dynamic storage device and/or read only memory (ROM) and/or other static storage device, coupled to the bus 704 for storing data and instructions to be executed by the processor 701, e.g., kernel 714, userspace 716, portions of the kernel and/or the userspace, and components thereof. The memory 702 is also used, in some embodiments, for storing temporary variables or other intermediate information during execution of instructions to be executed by the processor 701.

A storage device 710, such as a magnetic disk or optical disk, is provided, in some embodiments, and coupled to the bus 704 for storing data and/or instructions, e.g., kernel 714, userspace 716, etc. The I/O device 708 comprises an input device, an output device and/or a combined input/output device for enabling user interaction with the system 700. An input device comprises, for example, a keyboard, keypad, mouse, trackball, trackpad, and/or cursor direction keys for communicating information and commands to the processor 701. An output device comprises, for example, a display, a printer, a voice synthesizer, etc. for communicating information to a user.

In some embodiments, the processes described with respect to one or more of steps 501, 503, 505, 601, 603, 605 are realized by a processor, e.g., the processor 701, which is programmed for performing such processes. One or more of the memory 702, the I/F 706, the storage 710, the I/O device 708, the hardware components 718, and the bus 704 is/are operable to receive design rules and/or other parameters for processing by the processor 701. One or more of the memory 702, the I/F 706, the storage 710, the I/O device 708, the hardware components 718, and the bus 704 is/are operable to output the configuration with the optimal property as selected by the processor 701 at steps 505, 605.

In some embodiments, one or more of the processes is/are performed by specifically configured hardware (e.g., by one or more application specific integrated circuits or ASIC(s)) which is/are provided) separate from or in lieu of the processor. Some embodiments incorporate more than one of the described processes in a single ASIC.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

The above method embodiment shows exemplary steps, but they are not necessarily required to be performed in the order shown. Steps may be added, replaced, changed order, and/or eliminated as appropriate, in accordance with the spirit and scope of embodiments of the disclosure. Embodiments that combine different features and/or different embodiments are within scope of the disclosure and will be apparent to those skilled in the art after reviewing this disclosure.

According to some embodiments, a method of generating an optimized layout of semiconductor components in conformance with a set of design rules includes generating, for a unit cell comprising one or more semiconductor components, a plurality of configurations each of which satisfies some, but not all, of the design rules. For each configuration, it is checked whether a layout, which is a repeating pattern of the unit cell, satisfies the remaining design rules. Among the configurations which satisfy all of the design rules, the configuration providing an optimal value of a property is selected for generating the optimized layout of the semiconductor components.

According to some embodiments, a method of optimizing a region of MOSCAPs in conformance with a set of design rules includes generating, for a unit cell comprising a number of MOSCAPs, a plurality of configurations each of which satisfies some, but not all, of the design rules. For each configuration, it is checked whether a layout, which is a repeating pattern of the unit cell within the region, satisfies the remaining design rules. Among the configurations which satisfy all of the design rules, the configuration providing the maximal capacitance efficiency is selected for generating an optimized layout of the MOS capacitors within the region.

According to some embodiments, a computer system includes an input unit for receiving a set of design rules for metal-oxide-semiconductor (MOS) capacitors in a region of a semiconductor device, a processor, and an output unit. The processor is configured to generate, for a unit cell comprising a number of MOS capacitors, a plurality of configurations each of which satisfies some, but not all, of the design rules. The processor is also configured to check, for each configuration, whether a layout, which is a repeating pattern of the unit cell within the region, satisfies the remaining design rules. The processor is further configured to select, among the configurations which satisfy all of the design rules, the configuration providing the maximal capacitance efficiency. The output unit is configured to output the selected configuration.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of generating a layout of semiconductor components in conformance with a set of design rules, said method comprising:
   generating, for a unit cell comprising one or more semiconductor components, the one or more semiconductor components comprising a poly region and a corresponding oxide definition region, a plurality of configurations that each satisfy a first sub-set of the design rules, the first sub-set of the design rules comprising at least three of the design rules, the at least three design rules including a poly extension rule defining a limit with respect to an amount the poly region is allowed to project in a width direction of the unit cell beyond the corresponding oxide definition region, said generating being performed by a processor;
   determining one or more configurations of the plurality of configurations that comprise a proposed layout that also satisfies a second sub-set of the design rules, wherein the proposed layout is a repeating pattern of the unit cell, said second sub-set satisfaction determination being performed by the processor;
   determining a performance property value associated with a performance factor of the one or more configurations determined to also satisfy the second sub-set of the design rules, said performance property value determination being performed by the processor; and
   selecting a layout generation configuration for generating the layout of the semiconductor components, the layout generation configuration being one of the one or more configurations determined to also satisfy the second sub-set of the design rules, and the layout generation configuration being the configuration providing a maximum value of the determined performance property values associated with the performance factor.

2. The method of claim 1, wherein the performance property value is not directly defined by the design rules.

3. The method of claim 1, wherein the performance property value is related to an electrical property of said semiconductor components.

4. The method of claim 1, further comprising
   duplicating the unit cell having the selected layout generation configuration to obtain said layout.

5. The method of claim 4, wherein the second sub-set satisfaction determination is performed within a check window located at multiple locations in said proposed layout.

6. The method of claim 1, wherein
said first sub-set of the design rules define limits on (i) dimensions of each semiconductor component and (ii) spacings between adjacent semiconductor components, and
said second sub-set of the design rules define (a) a check window and (b) limits on densities of different layers of said semiconductor components within the check window.

7. The method of claim 1, further comprising
generating the layout of the semiconductor components based on the selected layout generation configuration; and
manufacturing a semiconductor device having said region of said semiconductor components arranged in the generated layout.

8. The method of claim 1, wherein the semiconductor components are metal-oxide-semiconductor (MOS) capacitors, and the maximum value of the performance property is a maximal capacitance efficiency of the MOS capacitors.

9. The method of claim 8, further comprising:
duplicating the unit cell having the selected configuration to fill up a region for the MOS capacitors thereby obtaining said layout.

10. The method of claim 9, wherein
the second sub-set satisfaction determination is performed within a check window located at multiple locations in said region.

11. The method of claim 9, wherein
the second sub-set satisfaction determination is performed within check windows having different dimensions and located at multiple locations in said region.

12. The method of claim 9, further comprising
generating the layout of the MOS capacitors based on the selected layout generation configuration; and
manufacturing a semiconductor device having said region of said MOS capacitors arranged in the generated layout.

13. The method of claim 8, wherein
each MOS capacitor includes a gate electrode layer and an active layer,
said first sub-set of the design rules define limits on (i) dimensions of each MOS capacitor and (ii) spacings between adjacent MOS capacitors, and
said said second sub-set of the design rules define (a) a check window and (b) limits on densities of the gate electrode layer and the active layer within the check window.

14. The method of claim 8, wherein
each MOS capacitor includes a gate electrode layer and an active layer, and
said second sub-set of the design rules define (a) a check window and (b) a limit on a density of at least one of the gate electrode layer or the active layer within the check window.

15. The method of claim 14, wherein the second sub-set satisfaction determination includes at least one of
calculating the density of the gate electrode layer as a ratio of (i) a total area of the gate electrode layer within the check window to (ii) an area of the check window; or
calculating the density of the active layer as a ratio of (i) a total area of the active layer within the check window to (ii) the area of the check window.

16. The method of claim 15, wherein said generating includes
varying, from one of said plurality of configurations to another, at least one of an area, a length or a width of the gate electrode layer of each MOS capacitor, and
varying, from one of said plurality of configurations to another, a spacing between adjacent MOS capacitors.

17. The method of claim 15, further comprising
calculating a capacitance of the MOS capacitors in the unit cell, and
in said selecting, using the calculated capacitance to determine the layout generation configuration having the maximal capacitance efficiency.

18. The method of claim 1, wherein the set of design rules comprises a quantity of design rules greater than a quantity of design rules included in the first sub-set of the design rules and the second sub-set of the design rules comprises all of the design rules excluded from the first sub-set of the design rules.

19. A computer system, comprising:
an input unit for receiving a set of design rules for metal-oxide-semiconductor (MOS) capacitors in a region of a semiconductor device;
a processor configured to
generate, for a unit cell comprising a number of said MOS capacitors, the unit cell comprising a poly region and a corresponding oxide definition region, a plurality of configurations that each satisfy a first sub-set of the design rules, the first sub-set of the design rules comprising at least three of the design rules, the at least three design rules including a poly extension rule defining a limit with respect to an amount the poly region is allowed to project in a width direction of the unit cell beyond the corresponding oxide definition region;
determine one or more configurations of the plurality of configurations that comprise a layout that also satisfies a second sub-set of the design rules, wherein the layout is a repeating pattern of the unit cell within said region;
determine a capacitance efficiency value of the one or more configurations that satisfy the second sub-set of the design rules;
select a layout generation configuration having a maximal capacitance efficiency out of the one or more configurations that satisfy the second sub-set of the design rules; and
an output unit for outputting the selected layout generation configuration.

20. A non-transitory computer readable medium containing therein instructions for causing, when executed by a computer, the computer to perform a method of generating a layout of semiconductor components in conformance with a set of design rules, said method comprising:
generating, for a unit cell comprising one or more said semiconductor components, the one or more semiconductor components comprising a poly region and a corresponding oxide definition region, a plurality of configurations that each satisfy a first sub-set of the design rules, the first sub-set of the design rules comprising at least three of the design rules, the at least three design rules including a poly extension rule defining a limit with respect to an amount the poly region is allowed to project in a width direction of the unit cell beyond the corresponding oxide definition region,
determining one or more configurations of the plurality of configurations that comprise a layout that also satisfies a second sub-set of the design rules, wherein the layout is a repeating pattern of the unit cell;

determining a performance property value associated with a performance factor of the one or more configurations determined to satisfy the second sub-set of the design rules; and selecting a layout generation configuration for generating the layout of the semiconductor components, the layout generation configuration being one of the one or more configurations determined to also satisfy the second sub-set of the design rules, and the layout generation configuration being the configuration providing a maximum value of the determined performance property values associated with the performance factor.

\* \* \* \* \*